(No Model.)

G. DROVEDAL.
PLOW.

No. 531,167. Patented Dec. 18, 1894.

Witnesses
E. H. Monroe
N. F. Riley

Inventor
Gilbert Drovedal

By his Attorneys.
C. A. Snow & Co.

UNITED STATES PATENT OFFICE.

GILBERT DROVEDAL, OF WEST DULUTH, MINNESOTA.

PLOW.

SPECIFICATION forming part of Letters Patent No. 531,167, dated December 18, 1894.

Application filed August 14, 1894. Serial No. 520,281. (No model.)

*To all whom it may concern:*

Be it known that I, GILBERT DROVEDAL, a citizen of the United States, residing at West Duluth, in the county of St. Louis and State of Minnesota, have invented a new and useful Plow, of which the following is a specification.

The invention relates to improvements in plows.

The object of the present invention is to improve the construction of plows, and to enable the depth which the plow penetrates the soil to be readily regulated at the rear of the plow to avoid inconvenience to the operator, and to enable the plow to be readily adjusted to suit the character of the ground to be plowed.

The invention consist in the construction and novel combination and arrangement of parts, hereinafter fully described, illustrated in the accompanying drawings, and pointed out in the claims hereto appended.

Figure 1:
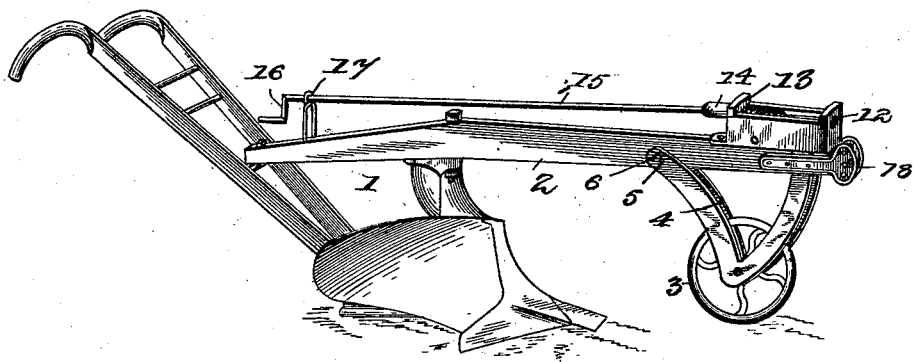
Figure 2:
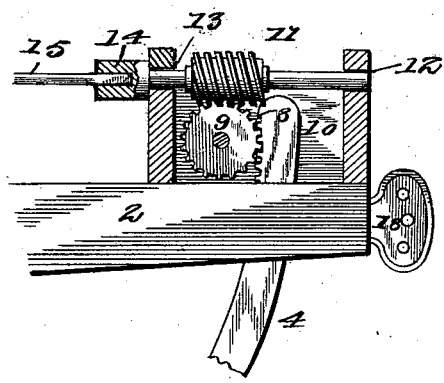
Figure 3:
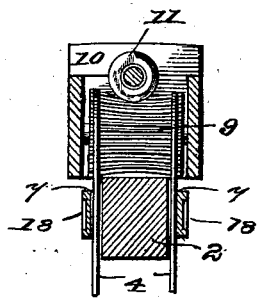

In the drawings: Figure 1 is a perspective view of a plow provided with an adjusting device constructed in accordance with this invention. Fig. 2 is a longitudinal sectional view of the adjusting device. Fig. 3 is a transverse sectional view.

Like numerals of reference indicate corresponding parts in all the figures of the drawings.

1 designates a plow, provided at the front of its beam 2 with a wheel 3, which is adapted to run on the ground, and to be adjusted vertically to regulate the depth of penetration of the plow, as will be readily understood. The wheel 3 is journaled between a pair of approximately V-shaped standards or rack-bars 4, which have the upper ends of their rear sides 5 pivoted at opposite sides of the plow beam, whereby the wheel 3, which is located at the apex of the rack-bars or standards, is adapted to be swung upward and downward on the pivot 6, to raise and lower the wheel, and to effect a consequent adjustment of the plow beam to regulate the penetration of the plow.

The front arms of the rack bars or standards pass upward through guide openings 7 of the plow beam, and are provided at their rear edges with teeth 8, which mesh with a transverse pinion or gear wheel 9, mounted in a casing 10 and meshing with an operating worm 11. The casing is constructed of suitable metal. It is substantially rectangular; and it is provided at its top with bearings 12 and 13, to receive the worm, which is disposed longitudinally of the plow beam. The bearing 13 is provided with a removable plate, to enable the worm to be readily detached from and replaced in the bearings of the casing.

The worm is provided with a rearward extending socket 14, receiving the front end of a longitudinally disposed shaft 15, which extends rearward from the casing, and terminates in a crank handle 16 at a point slightly in advance of the handle bars of the plow, in order to be within easy reach of the operator, and to enable the adjustment of the plow to be effected at the rear of the same, to avoid the operator leaving the handle-bars of the plow. The shaft 15 is journaled near its rear end in a bearing 17; and the openings 7 at opposite sides of the plow beam are formed by draft plates 18, located at the front end of the plow beam, in the usual manner.

It will be seen, that by rotating the shaft, the worm, meshing with the transverse pinion, will cause the rack-bars to raise and lower to adjust the wheel as desired; and it will also be apparent that the worm will lock the gear wheel against rotation, when in a state of rest, thereby obviating the necessity of employing a locking device to effect this result. This construction of gearing also enables the beam wheel to be adjusted vertically by simply rotating the shaft, and without the inconvenience of disengaging a locking device.

Changes in the form, proportion, and the minor details of construction may be resorted to without departing from the principle or sacrificing any of the advantages of this invention.

What I claim is—

1. The combination with a beam, of a rack-bar mounted on the beam and carrying a wheel for supporting the beam, a gear wheel meshing with the rack-bar and adapted to raise and lower the same, a worm meshing with the gear wheel, and means for rotating the worm, substantially as described.

2. The combination with a plow beam, of the rack-bars pivotally mounted at their rear ends on the beam, and provided at their opposite ends with teeth, a wheel journaled between the rack-bars, a transverse gear wheel mounted on the beam and engaging the teeth of the rack-bars, a worm meshing with the gear-wheel, and a rearward extending shaft connected with the worm, substantially as described.

3. The combination of a plow beam, a casing mounted thereon, the approximately V-shaped rack-bars pivoted at their rear terminals at opposite sides of the beam and having their front sides provided with teeth and arranged within the casing, a transverse gear wheel journaled in the casing and engaging the teeth of the rack-bars, a longitudinally disposed worm mounted in the casing and meshing with the gear wheel and provided with a rearward extending socket, and an operating shaft extending longitudinally of the beam and secured at its front end in the socket of the worm, substantially as described.

In testimony that I claim the foregoing as my own I have hereto affixed my signature in the presence of two witnesses.

GILBERT DROVEDAL.

Witnesses:
HARVEY P. SMITH,
S. E. PETERSON.